Patented Nov. 28, 1922.

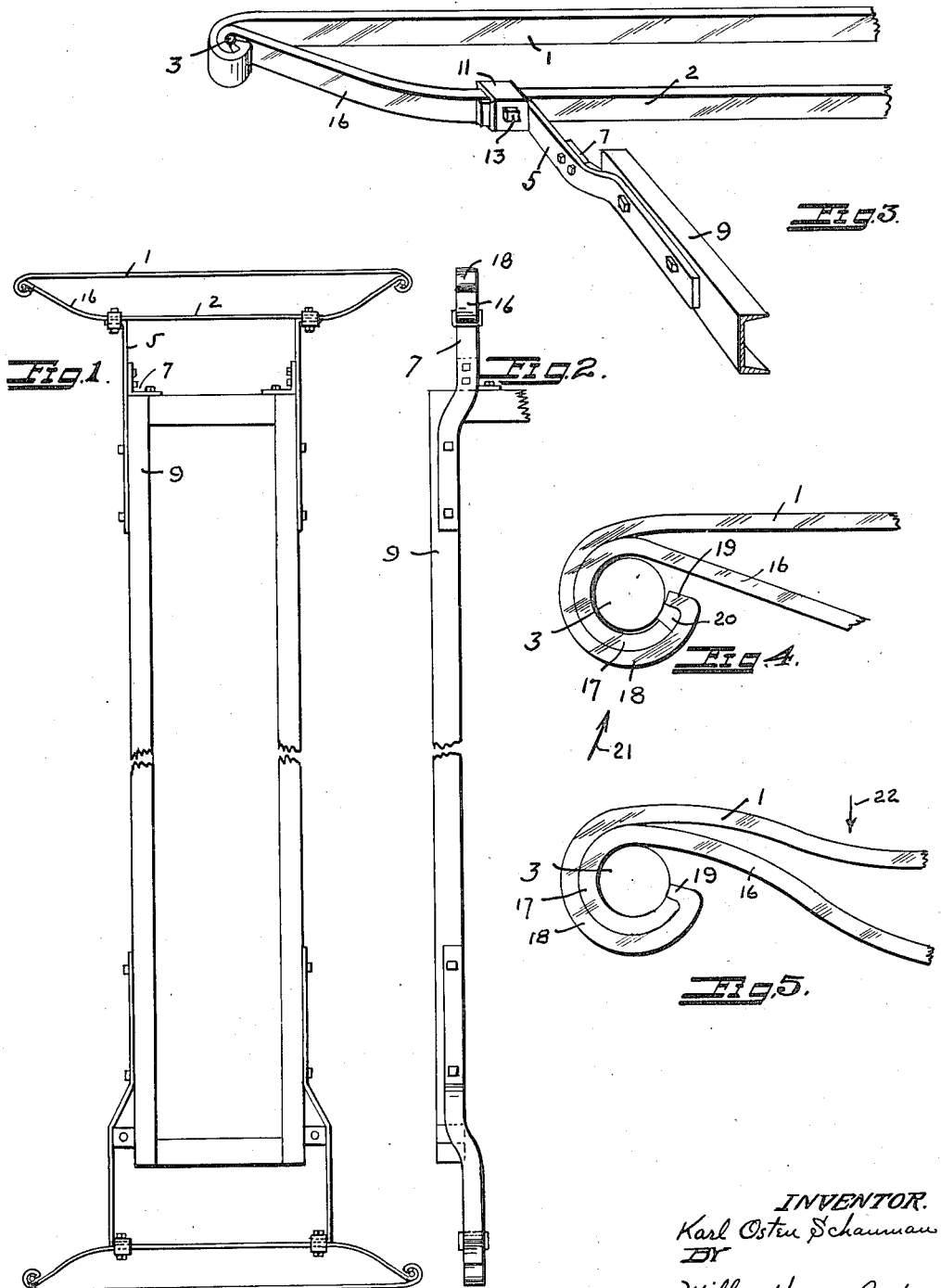

1,436,975

UNITED STATES PATENT OFFICE.

KARL OSTEN SCHAUMAN, OF SAN FRANCISCO, CALIFORNIA.

BUMPER.

Application filed May 11, 1922. Serial No. 560,084.

*To all whom it may concern:*

Be it known that I, KARL OSTEN SCHAUMAN, a subject of Sweden, and resident of the city and county of San Francisco, State of California, have invented new and useful Improvements in Bumpers, of which the following is a specification.

My invention has for its object an article of manufacture consisting of a device to be installed in the front or rear of an automobile or the like for protecting the vehicle, persons or objects from damage that would otherwise result from impact with any obstacle.

A further object is a vehicle bumper which if the rear portion thereof be accidentally engaged with a stationary object or other vehicle said bumper will distort under the strain without permanent damage thereto.

A further object is a bumper which will protect a vehicle against the engagement with stationary objects whether the said engagement takes place in front or rear portion of the bumper regardless of direction of the vehicle movement.

A further object is a bumper formed of two pieces hinged together at their ends, one of which is a tension member and the other is a spring member, the said hinge joint forming a locking means between the two members when distortion occurs in one direction but permitting a free movement of the members about the hinged axis when a strain is received in an opposite direction.

Other objects will appear from the disclosure which follows:

My bumper belongs to that class of device which is especially characterized by being formed of two members hinged at their ends in such a way that the members are locked together when the bumper meets a stationary object in front of the car and jointly function to flexibly resist the impact, but which move freely with respect to each other when a strain on the bumper comes from the opposite side, one member only functioning as a spring resistance, thus preventing permanent damage to the bumper itself while providing the necessary resiliency in all directions.

By referring to the accompanying drawing my invention will be made clear.

Fig. 1 is a plan view showing my bumper attached to both the front and back of the conventional Ford automobile.

Fig. 2 is a side elevation of Fig. 1.

Fig. 3 is an enlarged perspective view of one end thereof viewed from the rear.

Fig. 4 illustrates the position of the parts when a strain takes place from the rear in the direction of the arrow and on one end of the bumper.

Fig. 5 is a plan view of one end of the bumper showing the action of the two parts at the hinge joint when an obstacle in front and in the position 22 of the bumper is engaged thereby.

Throughout the figures similar numerals refer to identical parts.

My bumper consists principally of two members 1 and 2 hinged together on the ends by the pintles 3, 4. Member 2 is supported from the brackets 5 and 6 which are provided with reinforcing angles 7, 8, the brackets and angle members being adapted to engage the front portions 9, 10, of the said vehicle. The brackets 5 are clamped to the spring member 2 by the blocks 11, 12 and suitable cap screws, bolts or rivets as at 13 in the conventional way. The member 2 has the extended spring ends 15, 16, which are wound about to form the pintles as shown at 17 and 18 and the flexible tension member 1 is wound on the outside of coil 17 as shown at 18 and has its end bent inwardly as shown at 19 and substantially in contact with the holding means 3. The normal position of the parts is such that the space shown at 20 is substantially closed, whereupon any pressure in the direction of the arrow 21 of Fig. 4 causes the end 19 of the member 1 to engage the end 17 of the member 2, thus causing a tendency to unwind the spring end 16 and forcing or straining it into the position shown in Fig. 4, and causing the said end 16 only to act as a coil spring leaving a clear space 20 as shown. Whereas when pressure against the bumper end in the direction of the arrow 22 of Fig. 5 takes place the front member is forced in and the spring ends 15 and 16 also function to resist the pressure or impact by locking together.

It will now be seen that with the bumper of my invention the spring end 16 functions as a spring to cushion the vehicle movement against an obstacle in either direction. The member 1 serving at all times as a relatively flexible tension member to engage the spring ends 15, 16, when it contacts with an obstacle, whereby when a distortion of either end 15 or 16 takes place from the rear the front member 1 is relieved from any spring action but the corresponding spring end only functions as a resistance member.

In other words my bumper upon meeting an obstacle in front causes the tension member 1 to engage the hinges at 3 and 4, thereby offering the combined resistance of the members 1 and 2 and ends 15, 16, whereas for a blow in the direction of arrow 21, Fig. 4, due to the functioning of the single hinge joint and one end only of member 2, functions as a resistance member.

I claim:

1. A vehicle bumper comprising a supporting member having side extended spring portions each of said spring portions bent around on its end forming a pintle of incomplete circumference, a tension member having its ends engaged in hinge relation about the two spring pintles and bent inward substantially at right angles within the space formed by the incomplete circumference and adapted to engage against said pintle when the tension member is distorted from normal position.

2. A vehicle bumper comprising an inner spring member whose end portions are bent around forming a pintle having an incomplete circular periphery thus forming a space between the body portion of the inner member and the ends, and an outer member whose end portions are bent to embrace said pintles and whose ends are bent inward within said spaces.

3. A vehicle bumper comprising an inner spring member whose end portions are bent around forming a pintle having an incomplete circular periphery thus forming a space between the body portion of the inner member and the ends, and an outer member whose end portions are bent to embrace said pintles and whose ends are bent inward within said spaces, wherein there is a freedom of movement allowed before the end of the outer member engages the end of the inner member.

4. A vehicle bumper comprising a supporting member having side extended spring portions each of said spring portions bent around on its end forming a pintle of incomplete circumference, a tension member having its ends engaged in hinge relation about the two spring pintles and bent inward substantially at right angles within the space formed by the incomplete circumference and adapted to engage against said pintle when the tension member is distorted from normal position said first named member being under spring distortion to keep the second named member in tension.

5. A vehicle bumper comprising an inner spring member whose end portions are bent around forming a pintle having an incomplete circular periphery thus forming a space between the body portion of the inner member and the ends, and an outer member whose end portions are bent to embrace said pintles and whose ends are bent inward within said spaces, said first named member being under spring distortion to keep the second named member in tension.

6. A vehicle bumper comprising an inner spring member whose end portions are bent around forming a pintle having an incomplete circular periphery thus forming a space between the body portion of the inner member and the ends and an outer member whose end portions are bent to embrace said pintles and whose ends are bent inward within said spaces, wherein there is a freedom of movement allowed before the end of the outer member engages the end of the inner member, said first named member being under spring distortion to keep the second named member in tension.

7. A vehicle bumper as set forth in claim 1 wherein the ends of the members circumferentially separate as the members are sprung apart but lock together circumferentially if the members are forced toward each other.

8. A vehicle bumper as set forth in claim 2 wherein the ends of the members circumferentially separate as the members are sprung apart but lock together circumferentially if the members are forced toward each other.

9. A vehicle bumper as set forth in claim 3 wherein the ends of the members circumferentially separate as the members are sprung apart but lock together circumferentially if the members are forced toward each other.

10. A vehicle bumper as set forth in claim 4 wherein the ends of the members circumferentially separate as the members are sprung apart but lock together circumferentially if the members are forced toward each other.

11. A vehicle bumper as set forth in claim 5 wherein the ends of the members circumferentially separate as the members are sprung apart but lock together circumferentially if the members are forced toward each other.

12. A vehicle bumper as set forth in claim 6 wherein the ends of the members circumferentially separate as the members are sprung apart but lock together circumferentially if the members are forced toward each other.

KARL OSTEN SCHAUMAN.